M. J. COONEY & H. J. BENDER.
UNIVERSAL JOINT.
APPLICATION FILED FEB. 20, 1918.

1,291,418.

Patented Jan. 14, 1919.

INVENTORS
Michael J. Cooney and
Henry J. Bender
BY
Dyke & Canfield
ATTORNEYS

UNITED STATES PATENT OFFICE.

MICHAEL J. COONEY AND HENRY J. BENDER, OF PLAINFIELD, NEW JERSEY.

UNIVERSAL JOINT.

1,291,418.

Specification of Letters Patent.

Patented Jan. 14, 1919.

Application filed February 20, 1918. Serial No. 218,329.

*To all whom it may concern:*

Be it known that we, MICHAEL J. COONEY and HENRY J. BENDER, citizens of the United States, and residents of Plainfield, county of Union, and State of New Jersey, have invented certain new and useful Improvements in Universal Joints, of which the following is a specification.

Our invention relates to a universal joint adapted for use in transmitting power. The object of the invention is the provision of a simple form of universal joint which can be readily and cheaply constructed and with which repairs or replacements can be performed with facility. The invention further relates to the improvement of devices of the character referred to in a number of important respects, and with the foregoing and related objects in view, our invention consists in the parts, constructions, improvements and combinations herein set forth and claimed.

Figure 1:
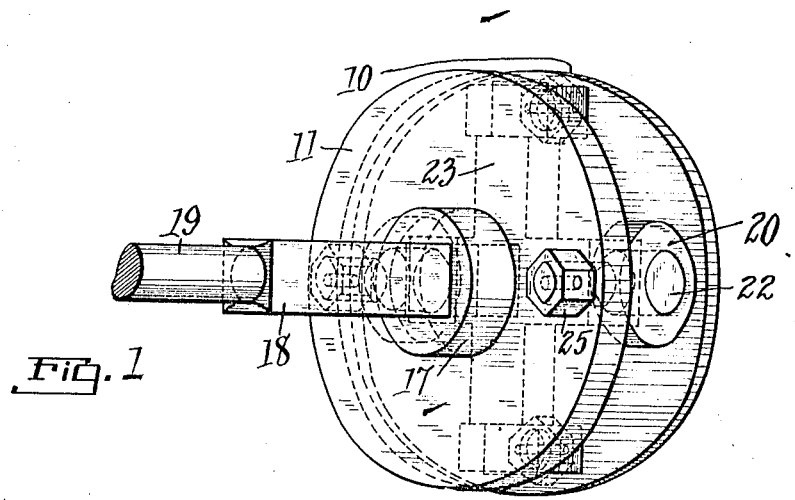
Figure 2:
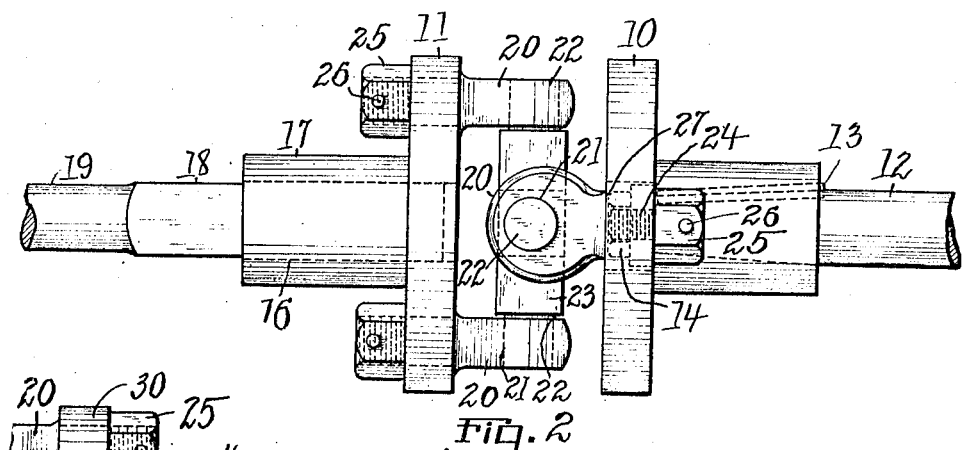
Figure 3:
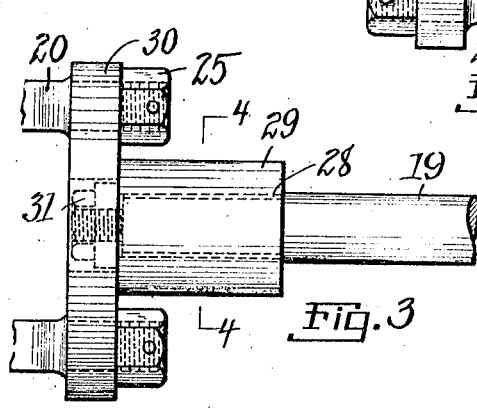
Figure 4:
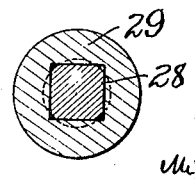

In the accompanying drawing we have shown an embodiment of our invention for the purpose of making the same clearly understood, and in the said drawing Figure 1 is a perspective view of one form of universal joint embodying our invention. Fig. 2 is a side view of the joint shown in Fig. 1. Fig. 3 is a partial side view of a shaft connection, and Fig. 4 is a cross-sectional view taken on the line 4, 4, Fig. 3.

It is customary, in the manufacture of universal joints, to provide a pair of fork members which have bearings provided therein for an intermediate floating member. When breakage occurs it is usually in the fork members, which have to be replaced and the entire removal of the joint and connected shafts may be necessary in order that such replacement can be carried out. In accordance with the present invention, in place of the usual fork members, a header having lugs removably secured thereto is provided, and these lugs carry the bearings for the intermediate floating member, preferably having the form of a cross. When the bearings are worn, or if a lug breaks, it is possible to readily remove the same and replace it by a new lug. Such repairs and replacement can be carried out with the utmost facility and without the necessity of taking down the whole apparatus.

The members carrying the lugs may be of any form, but we have shown them of circular or dish form, and we shall designate such members by the term "headers". These headers 10 and 11 are secured, respectively, to the adjacent ends of the driving and driven shafts. In the form shown the driving shaft is indicated at 12 and is secured rigidly to the header 10 by a taper and spline connection, the spline being indicated at 13 and bolted in place by means of a nut 14 on the threaded end of the shaft 12. The header 11, in the form shown, has a square hole 16 broached in its hub 17 for the reception of the squared end 18 of the driven shaft 19, or it may be connected with the shaft 19 in other ways permitting of the longitudinal movement of said shaft relative to the header 11, or the driving shaft may be slidably connected with the universal joint and the driven shaft rigidly connected if desired.

Removably secured to each of the headers 10 and 11 is a pair of lugs 20 having alined bearing openings 21 therein for the reception of the journals 22 on the cross 23, these journals being in pairs at right angles to one another and journaled in lugs 20 on the headers 10 and 11 respectively. Various modes of securing the lugs 20 to the headers may be resorted to, but in the form shown they are bolted in the headers 10 and 11 and are provided with threaded shanks 24 adapted to extend through openings in the headers and to be securely held in place by means of nuts 25 which may be prevented from rotating by any suitable means, as, for instance, by means of pins 26 driven through the threaded shanks 14 and the nuts 25, suitable openings being provided therefor. The studs 20 are provided with square shoulders 27 which are seated against the headers, thereby fixedly determining the distance of the bearing openings 21 from the headers so that correct alinement may be secured without any difficulty. When the studs 20 are firmly secured and bolted in place, they, together with the headers, form very substantial fork members, and, as already stated, the lugs and also the cross may be readily replaced in case of wear or breakage.

Universal joints are preferably used in pairs, and in Fig. 3 we have shown one mode of connecting the other end of the shaft 19, appearing in Fig. 2, to the member of another universal joint similar to that already described. The shaft 19 may be squared, as indicated at 28, Fig. 4, and may be secured to the hub 29 of a member 30, as by means of a nut 31 screwed on the threaded shank on the end of the shaft provided for that purpose. The squared end may be tapered somewhat, if desired. When the universal joints embodying the invention are used in pairs, there is no need, in the case of the second joint, for a sliding shaft connection, as a single sliding connection, such as shown in Fig. 2, suffices for all requirements of both universal joints of the pair.

It will be seen that a universal joint in accordance with our invention embodies numerous advantages. It may be readily assembled, is strong and rugged, breakage and wear is substantially always confined to the cross or to the bearing lugs 20, all of which can be readily replaced by simply removing one or more of the nuts 25 and lugs 20, as may be necessary, and without disturbing the shafts or the headers or any associated parts or members.

We claim:

1. In a universal joint, a pair of headers adapted to be secured to adjacent shaft ends, a pair of opposite lugs having bearings therein and having shoulders for locating said bearings with respect to the headers, means coöperating with said shoulders for securing said lugs to said headers and in predetermined relation thereto, and a cross member journaled in the bearings in said lugs.

2. In a universal joint, a pair of headers adapted to be rigidly and slidably secured respectively to adjacent shaft ends, a pair of opposite openings provided in each header, a pair of lugs having bearing openings therein and adapted to be received in the holes in the headers and having shoulders for determining the extent of projection of said bearing openings beyond said headers, bolts for securing said lugs to said headers, and a cross having two pairs of journals at right angles to each other and journaled in the lugs secured to the respective headers.

In testimony that we claim the foregoing, we have hereto set our hands, this 16th day of February, 1918.

MICHAEL J. COONEY.
HENRY J. BENDER.